P. L. WILLET.
SEED CLEANER.
APPLICATION FILED DEC. 14, 1911.
1,030,260.
Patented June 18, 1912.
2 SHEETS—SHEET 1.
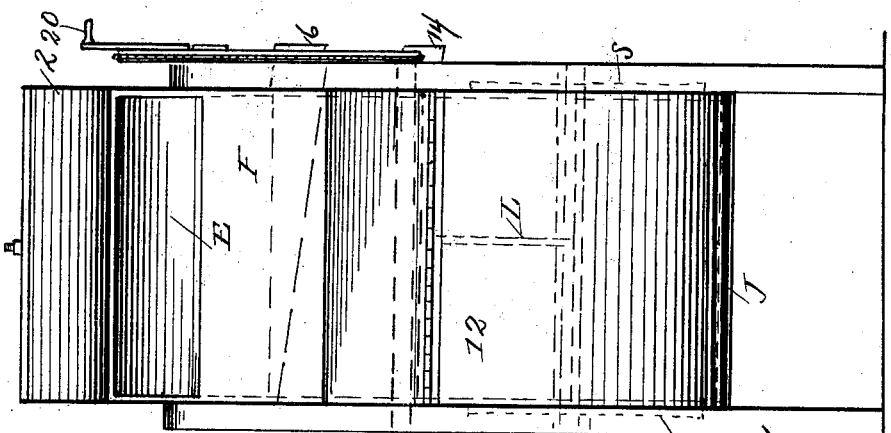
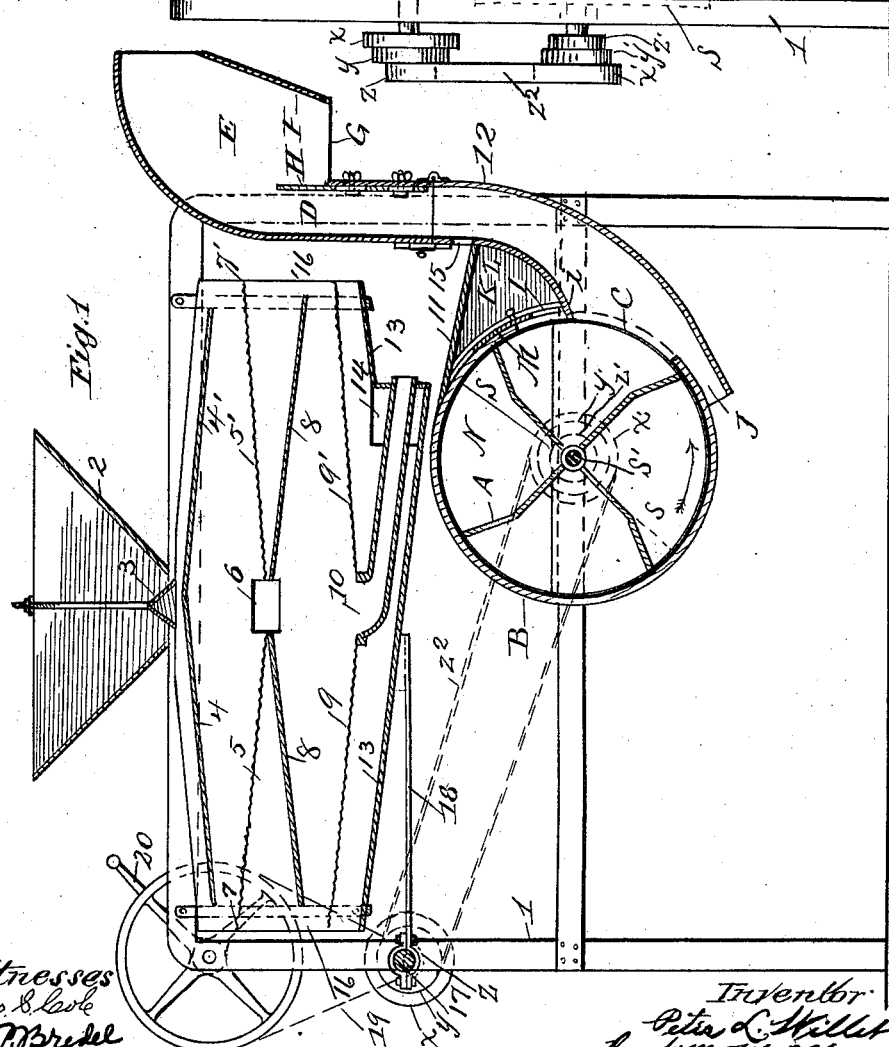

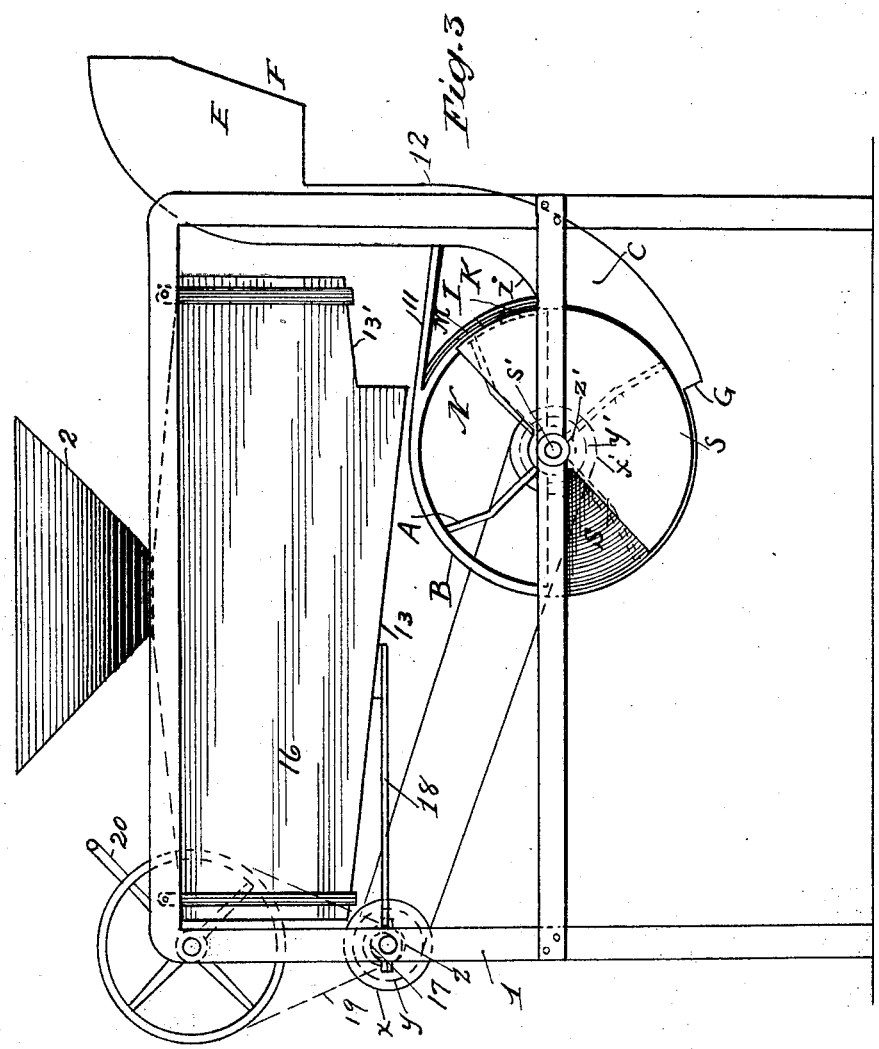

UNITED STATES PATENT OFFICE.

PETER L. WILLET, OF SHILOH, OHIO.

SEED-CLEANER.

1,030,260. Specification of Letters Patent. Patented June 18, 1912.

Original application filed April 14, 1911, Serial No. 621,074. Divided and this application filed December 14, 1911. Serial No. 665,859.

*To all whom it may concern:*

Be it known that I, PETER L. WILLET, a citizen of the United States, and resident of Shiloh, in the county of Richland and State of Ohio, have invented certain new and useful Improvements in Seed-Cleaners, of which I hereby declare the following to be a full, clear, and exact description, such as will enable others skilled in the art to which it appertains to make and use the same.

The objects of the invention are to provide an efficient and practical form of seed cleaner for general use and particularly constructed and arranged for cleaning grain and extremely light and small seeds such as timothy, blue grass, red top and all light chaff bearing seeds, such as flower seeds for florists' use, and all light and minute seeds having an inclosing scale or chaff like glume from which owing to the lightness of the seeds it is difficult to separate the chaff.

The construction includes a preliminary treatment of the seed and chaff by automatically acting means for separating the particles of seed and chaff from each other as widely as possible and distributing them over a series of inclined screens in a layer of uniform thickness and therefore expose each particle of seed to individual contact with the surface of each screen, so that every particle is separately treated.

The seed is delivered to the blast containing only the finest dust or chaff particles and in a constant stream of uniform thickness. It is then necessary that the blast shall be uniform at all times and shall be adjustable to such a fine degree of intensity as to overcome the specific gravity of the chaff, but not sufficient force to overcome the higher specific gravity of the seeds.

Since some seeds such as blue grass are extremely fine their specific gravity is very slightly above that of the chaff and the blast must be provided with fine adjusting means for making it exactly uniform throughout the area of the blast opening, and also with adjusting means for controlling the force and direction thereof. I obtain the results described in the first requirement by means of a set of reversely inclined plates over which the mixed grain and chaff travel from a central opening, and from the outer edges of which they fall upon reversely inclined screens, one set of plates and screens alternates with following sets of the same in which the screens have finer and finer openings. The seed falls through the openings in the upper screens and the chaff is carried off through lateral chutes until the last screen is reached, and the seed is carried upon the surface of this permitting the finest dust remaining to pass through.

To insure a constant flow of the particles over the screens and plates and a continuous discharge of uniform thickness into the blast passage, the screens and plates are mounted upon swinging side walls, and are given a swinging movement longitudinal of the side walls but at right angles to the edges of the sieves and plates so that the particles are projected from the lower edges of the screens and plates on alternate sides of the machine, this longitudinal movement serving also to further separate and distribute the particles and carry them down the inclined surfaces in a layer of uniform depth throughout all the surfaces. This portion of the device is further described in my previous application Ser. No. 621,074, filed April 14, 1911, for seed cleaner, of which this is a divisional application.

The portion of the device by means of which a blast of adjustable power is obtained comprises means for preventing backward flow of the draft through any portion of the blast pipe, means for increasing or decreasing the volume of the air flowing through the blower at any time, and also means for regulating the direction from which the blast is obtained.

The devices for accomplishing these purposes are shown in the accompanying drawings, are hereinafter more fully described, and specifically pointed out in the claims.

In the accompanying drawings Figure 1 is a longitudinal section of the device; Fig. 2 is an end elevation thereof, and Fig. 3 is a side elevation of the same.

In these views 1 is the frame of the machine, 2 is a chute having inclined sides upon which the mixed seed and chaff are carried to the distributing and separating devices below.

3 is a conical deflector over which the material is carried and which is located in the mouth of the chute to separate the stream of material as much as possible before it is deposited upon the distributing devices.

4, 4' are reversely inclined plates which receive the material from the chute 2 upon the angle of their junction and upon which it slides slowly in divided streams, so as to scatter the particles from each other, so that a thin layer which is uniformly distributed over each plate will fall from the outer edge. Beneath the plates are shown reversely inclined sieves 5, 5' which are provided with openings adapted to permit of the passage of the seed therethrough and to convey away the coarser chaff through a common chute 6. The material is received first upon the outer projecting end of the sieve at 7, 7' and thence the chaff travels toward the lower ends while the seed and finer chaff are distributed over the surface of the sieve until each particle has fallen through the same.

Beneath the sieves 5 and 5' are reversely inclined redistributing plates 8 and 8' which redistribute the material from the coarse sieves and discharge it in an even thin layer over their lower ends upon the reversely inclined fine sieves 9, 9' which project outward at their upper ends to receive it. Through these sieves the finer dust or chaff passes and the seed remains upon it and is distributed uniformly thereover, thus separating the grains and permitting them to free themselves from the dust particles, the seed and any fine dust carried with the seed, then passes through the common opening 10 and thence is delivered upon a plate 11 from which it is discharged within the blast pipe 12. Underneath the last sieves 9, 9' are reversely inclined plates 13, 13' which extend beyond the outer edges of the last sieves and catch the dust falling therethrough and convey it to a common chute 14.

The blower and outlet and outlet passages are constructed and controlled as follows: A is the fan or rotating blower which operates in the drum B and the outlet passage C therefrom communicates with the interior of the drum below the horizontal center line of the fan, and rises above the fan at D and terminates in an outwardly turned portion or hood E having a front wall F closing the lower portion, and an opening G is left at the bottom for the discharge of any seed that may be carried over by the blast. A vertical slide H at the top of the front wall serves to lengthen or shorten the blast passage, and thereby to strengthen or lessen the force thereof.

The reversely inclined plates and corresponding sieves are mounted upon the swinging boards 16, 16, and are vibrated at right angles to their edges by means of the eccentric 17 and rod 18 and suitable driving means such as the chain 19 and hand crank 20. This action operates the plates and screens to cause the seed and chaff to separate and flow down them and over their edges in a fine stream.

The seed traversing the inclined plate 11 passes through an opening 15 in the wall of the blast pipe and passes into the blast in the widely distributed condition heretofore described. The action of the eccentric in vibrating the screens and plates in a direction at right angles to their edges causes the seed to flow alternately from the edges of the opposite screens, so that the flow is continuous and evenly distributed and therefore of constant thickness so that no pulsation of the blast will be produced such as would occur if the flow of seed were irregular. Such action of the blast would have a very irregular effect and would cause the blast to become alternately strong and weak. When the seed comes in masses the blast could not penetrate it and when little seed fell the blast would be too powerful so that a uniform action could not be obtained and small seed could not be separated from the chaff.

I is an opening for air inlet to the blower and is so located as to prevent the air from being drawn out of the blast pipe into the drum. This opening is located in the wall of the drum B just above or closely adjacent to the horizontal center line of the fan A and just above the outlet opening C.

The blades of the fan A turn backward and revolve to the left as shown in Fig. 1. The action of the fan therefore drives the air as it flows into the drum to the left and downward and then to the right and out of the outlet opening.

The location of the inlet opening I just above the wall $i$ of the outlet opening C is important since the edge of the wall $i$ prevents the air from the upper part of the blast pipe from being drawn back into the drum, and fresh air will be constantly drawn into the drum from the opening above. The closer the inlet and outlet openings are together the better the result, since the inlet opening located directly above the outlet opening relieves the suction which would otherwise be caused upon the outlet passage.

The blast passage terminates in a channel J below the drum through which the cleaned seed falls.

A transverse air inlet passage K communicates with the opening I and its walls may be formed of the wall of the drum B the wall $i$ of the blast pipe, and the delivery plate 11. A central partition L in this air passage K prevents the air from blowing through the passage from one side to the other so that the current of air will be independent of the direction of the wind. A slide M controls the width of the opening I.

To obtain the required volume of air and to increase or diminish this volume to adapt it to cleaning fine or coarse seed and to be able to supply additional air to the drum from selected ends, according to the direction from which the wind blows, the upper half of each end of the drum is left open at N, N and rotatable valves or closures S are pivoted on the drum shaft S'. These valves can be turned to minutely control the air inlet and are also used to prevent the air from blowing through the drum if the wind is blowing strongly. The effect of such an unequal draft would be to collect the seed upon one side, that is the leeward side of the blast, and would also have the effect of producing a strong draft on the leeward side while the draft would be weak on the windward side of the blast, and hence the chaff would fall down upon the windward side and a perfectly uniform draft could not be obtained. The draft can be further controlled by regulating the speed of the fan. To provide for this adjustment stepped driving pulleys $x$, $y$, and $z$ are connected as desired with stepped pulleys $x'$, $y'$, and $z'$ by a belt $z^2$.

For fine seed a scarcely perceptible draft is required to clean the seed if it falls in a thin distributed layer into the blast passage, such as will be obtained by the arrangement of transversely vibrating screens and plates described.

The feeding of the material in a widely distributed stream renders the effect of the blast uniform on all grains, because when a given pressure of air meets a stream of grain the pressure of air upon each individual grain will not be the same unless the thickness of the layer of grain is uniform throughout. If one part of the layer of grain is thinner than another the draft will have more effect upon the grain in the thin portion than in the other parts which are thicker. The draft cannot act individually upon all the grains unless a perfect very wide distribution is provided of grain in a thin layer. This is essential to perfect uniformity of action and effect of the blast on all grains.

Having described the invention what I claim as new and desire to secure by Letters Patent is:

1. In a seed cleaner, a drum and rotatable fan therein, a blast pipe communicating with the drum at one side, at a point below the center of said fan, an air inlet chute having an opening located above and closely adjacent to the blast opening into said pipe, means for supplying an additional volume of air to the fan from the ends of the drum above the center of the fan and for regulating the amount of air thus supplied and means for regulating the direction from which the air is supplied to the fan.

2. In a seed cleaner, a drum, a fan therein, a blast pipe leading from said drum at one side, means for supplying the fan with a volume of air, means for controlling the volume of air supplied, adjustable means for preventing a backward flow of air from the blast pipe into the drum, and means for regulating the direction from which the air is supplied to the fan.

3. In a seed cleaner, a drum provided with a blast opening at one side located below a plane on the horizontal center line of said drum, said drum also provided with an air inlet opening above and closely adjacent to said blast opening, and located closely adjacent to said horizontal plane, and means for adjusting the width of said inlet opening.

4. In a seed cleaner, a drum and fan therein, a blast pipe communicating with said drum at one side, below the center of the fan, means for supplying a volume of air to the drum, said means preventing a backward flow of air into the drum from the blast pipe.

5. In a seed cleaner, a drum, a fan therein, a blast pipe communicating with the side of said drum, said drum having an opening at each end thereof above the center of said fan for air admission to the drum, independent closures for said openings, an air inlet chute having an inlet opening for air admission to the drums above said blast opening, the lower edge of said opening being closely adjacent to a plane on the horizontal center of said fan, and means for supplying the material to be cleaned in a constant widely distributed stream of uniform thickness into said blast pipe, whereby the force of the blast will affect all grains uniformly.

6. In a seed cleaner, a drum, a fan therein, a blast pipe leading from said drum at one side, said drum having an opening at each end thereof above the center of said fan for supplying a volume of air thereto, an air inlet chute having an inlet opening for air above said blast opening, the lower edge of said opening being on or closely adjacent to the plane of the horizontal center of said fan, and means for adjusting the width of said opening.

7. In a seed cleaner, a drum having an opening at each end above the center thereof, an adjustable closure for each opening, a blast pipe communicating with said drum by a blast opening, at one side, below the center of said fan and having an opening at its lower end, a transverse air chute having a central partition and communicating with said drum above and closely adjacent to said blast opening, on each side of said
5 partition, said blast pipe having an opening for admission of material to be treated above the blast opening in said drum.

In testimony whereof, I hereunto set my hand this 6" day of December, 1911.

PETER L. WILLET.

In presence of—
Geo. O. Willet,
Wm. M. Monroe.

---

Copies of this patent may be obtained for five cents each, by addressing the "Commissioner of Patents, Washington, D. C."